(12) United States Patent
Masuda

(10) Patent No.: US 10,680,716 B2
(45) Date of Patent: Jun. 9, 2020

(54) TRANSMISSION APPARATUS, TRANSMISSION METHOD, AND FILTER CIRCUIT

(71) Applicant: SONY SEMICONDUCTOR SOLUTIONS CORPORATION, Kanagawa (JP)

(72) Inventor: Takashi Masuda, Tokyo (JP)

(73) Assignee: Sony Semiconductors Solutions Corporation, Kanagawa (JP)

( * ) Notice: Subject to any disclaimer, the term of this patent is extended or adjusted under 35 U.S.C. 154(b) by 400 days.

(21) Appl. No.: 15/513,005

(22) PCT Filed: Sep. 17, 2015

(86) PCT No.: PCT/JP2015/076412
§ 371 (c)(1),
(2) Date: Mar. 21, 2017

(87) PCT Pub. No.: WO2016/052218
PCT Pub. Date: Apr. 7, 2016

(65) Prior Publication Data
US 2017/0310398 A1 Oct. 26, 2017

(30) Foreign Application Priority Data

Sep. 30, 2014 (JP) ................................ 2014-199878

(51) Int. Cl.
*H04B 10/508* (2013.01)
*G06F 13/36* (2006.01)
(Continued)

(52) U.S. Cl.
CPC ........... *H04B 10/508* (2013.01); *G06F 13/36* (2013.01); *H04B 10/2503* (2013.01);
(Continued)

(58) Field of Classification Search
CPC . G06F 13/36; G06F 13/4282; H04B 10/2503; H04B 10/508; H04B 10/516;
(Continued)

(56) References Cited

U.S. PATENT DOCUMENTS

| | | | |
|---|---|---|---|
| 2002/0140459 A1* | 10/2002 | Toda | ........................ H03K 5/06 326/112 |
| 2005/0213979 A1* | 9/2005 | Nakashima | ............ H04B 10/07 398/79 |

(Continued)

FOREIGN PATENT DOCUMENTS

| | | |
|---|---|---|
| JP | 62-000123 A | 1/1987 |
| JP | 6-178032 A | 6/1994 |

(Continued)

OTHER PUBLICATIONS

International Search Report prepared by the Japan Patent Office dated Nov. 11, 2015, for International Application No. PCT/JP2015/076412.

(Continued)

*Primary Examiner* — Amritbir K Sandhu
(74) *Attorney, Agent, or Firm* — Sheridan Ross P.C.

(57) ABSTRACT

The present technology relates to a transmission apparatus, a transmission method, and a filter circuit that make it possible to transmit a signal with high quality, the signal including a plurality of signals having different speeds. The transmission apparatus includes a detection unit that detects each of a plurality of signals having different speeds from an input signal. Further, the transmission apparatus includes an output control unit that controls output of an output signal including the plurality of signals, on the basis of detection results of the plurality of signals by the detection unit. The present technology can be applied to, for example, a transmission apparatus that transmits a serial signal conforming to the USB 3.0 standards or a transmis- (Continued)

sion apparatus that converts the serial signal described above into a millimeter-wave signal or an optical signal and sends and receives the signal.

17 Claims, 10 Drawing Sheets

(51) Int. Cl.
| | | |
|---|---|---|
| *H04L 25/49* | (2006.01) | |
| *H04B 10/90* | (2013.01) | |
| *H04B 10/25* | (2013.01) | |
| *H04B 10/69* | (2013.01) | |
| *H04B 10/516* | (2013.01) | |
| *H04B 10/80* | (2013.01) | |
| *G06F 13/42* | (2006.01) | |

(52) U.S. Cl.
CPC ........... *H04B 10/516* (2013.01); *H04B 10/69* (2013.01); *H04B 10/80* (2013.01); *H04B 10/90* (2013.01); *H04L 25/4902* (2013.01); *G06F 13/4282* (2013.01)

(58) Field of Classification Search
CPC ........ H04B 10/69; H04B 10/80; H04B 10/90; H04L 25/4902
USPC .................................................. 398/115–117
See application file for complete search history.

(56) References Cited

U.S. PATENT DOCUMENTS

| | | | | |
|---|---|---|---|---|
| 2006/0120418 A1* | 6/2006 | Harter | ................... | H01S 3/1643 372/30 |
| 2007/0069768 A1* | 3/2007 | Hatooka | ................. | H03K 5/19 327/74 |
| 2007/0118257 A1* | 5/2007 | Iida | ........................ | G07C 5/085 701/33.9 |
| 2009/0115542 A1* | 5/2009 | Nakamura | ................ | H03B 5/04 331/176 |
| 2010/0231258 A1* | 9/2010 | Iwai | ..................... | G11C 19/285 326/80 |
| 2012/0163801 A1* | 6/2012 | Takenaga | ........... | G02B 6/02042 398/16 |
| 2014/0006826 A1* | 1/2014 | Wagh | ................... | G06F 13/4282 713/323 |
| 2014/0029938 A1* | 1/2014 | Nakashima | .......... | G01M 11/336 398/28 |
| 2014/0050283 A1* | 2/2014 | Leiba | ..................... | H01Q 13/22 375/298 |
| 2015/0097556 A1* | 4/2015 | Edwards | .................. | G01D 5/20 324/207.25 |
| 2016/0069673 A1* | 3/2016 | Takayanagi | ........ | G01B 11/0641 250/339.11 |
| 2017/0310398 A1* | 10/2017 | Masuda | .................. | G06F 13/36 |
| 2018/0234098 A1* | 8/2018 | Masuda | ................. | H03L 7/081 |

FOREIGN PATENT DOCUMENTS

| | | |
|---|---|---|
| JP | 2002-300012 A | 10/2002 |
| JP | 2007-97176 A | 4/2007 |
| JP | 2009-253532 A | 10/2009 |
| JP | 2009253532 A * | 10/2009 |
| JP | 2011-229001 A | 11/2011 |
| JP | 2013-145469 | 7/2013 |

OTHER PUBLICATIONS

Official Action (with English translation) for Chinese Patent Application No. 2015800509160, dated Oct. 9, 2019, 20 pages.

\* cited by examiner

TRANSMISSION APPARATUS, TRANSMISSION METHOD, AND FILTER CIRCUIT

CROSS REFERENCE TO RELATED APPLICATIONS

This application is a national stage application under 35 U.S.C. 371 and claims the benefit of PCT Application No. PCT/JP2015/076412 having an international filing date of 17 Sep. 2015, which designated the United States, which PCT application claimed the benefit of Japanese Patent Application No. 2014-199878 filed 30 Sep. 2014, the disclosures of which are incorporated herein by reference in their entirety.

TECHNICAL FIELD

The present technology relates to a transmission apparatus, a transmission method, and a filter circuit, and particularly to a transmission apparatus, a transmission method, and a filter circuit that are suitably used in a case where a signal including a plurality of signals having different speeds is transmitted.

BACKGROUND ART

There has recently been a demand for converting a serial signal conforming to the USB (Universal Serial Bus) 3.0 standards (hereinafter, described as USB 3.0 signal) into an optical signal or a millimeter-wave signal and transmitting the converted signal.

In the USB 3.0, two types of signals, i.e., LFPS (Low Frequency Periodic Signaling) as low-speed control signal having a long period of 20 ns to 100 ns, and a high-speed transmission signal of 5 Gbps are transmitted. Further, in the USB 3.0, the following specifications are determined: a time period without transmission signal is set to an Electrical Idle state where no signal exists in the transmission path.

Therefore, in order to achieve the demand described above, it is desirable to make it possible to receive a serial signal including a plurality of signals having different speeds, i.e., a low-speed control signal and a high-speed transmission signal, and to transmit the received serial signal with high quality to a communication apparatus at a subsequent stage, the communication apparatus performing optical communication or millimeter-wave communication.

Meanwhile, a technology capable of detecting the USB 3.0 signal with low power consumption has been proposed in the past (see, for example, Patent Literature 1).

CITATION LIST

Patent Literature

Patent Literature 1: Japanese Patent Application Laid-open No. 2013-145469

DISCLOSURE OF INVENTION

Technical Problem

In Patent Literature 1, however, enabling reception of the USB 3.0 signal and transmission of the received USB 3.0 signal with high quality to a communication apparatus at a subsequent stage is not studied.

In this regard, the present technology makes it possible to transmit a signal including a plurality of signals having different speeds, such as the USB 3.0 signal, with high quality.

Solution to Problem

According to a first aspect of the present technology, there is provided a transmission apparatus including: a detection unit configured to detect each of a plurality of signals from an input signal, the plurality of signals having different speeds; and an output control unit configured to control output of an output signal on a basis of detection results of the plurality of signals, the output signal including the plurality of signals.

During detection of any of the plurality of signals, it is possible to make the output control unit perform control to output a detected signal, and during no detection of any of the plurality of signals, it is possible to make the output control unit perform control to keep the output signal at a predetermined level.

During detection of a part of the plurality of signals, it is possible to make the output control unit perform control to generate a detected signal and output a generated signal, and during detection of the rest of the plurality of signals, it is possible to make the output control unit perform control to output the input signal.

During detection of any of the plurality of signals, it is possible to make the output control unit perform control to output the input signal.

It is possible to make the plurality of signals include a first signal and a second signal which is faster than the first signal, and to make the detection unit be provided with a filter circuit configured to remove the second signal from the input signal and a first detection circuit configured to detect the first signal from the input signal from which the second signal is removed.

It is possible to make the input signal be a differential signal, and it is possible to make the detection unit further include a first hysteresis comparator configured to compare a positive-side signal and a negative-side signal of the input signal and to make the filter circuit remove the second signal from the input signal, the input signal being converted into a digital signal by the first hysteresis comparator.

It is possible to make the filter circuit include at least one of a first circuit and a second circuit, the first circuit including pulse width reducers that are connected in cascade and each shorten a pulse width of the signal, the second circuit including pulse width expanders that are connected in cascade and each expand the pulse width of the signal.

It is possible to make the second circuit of the filter circuit be provided at a subsequent stage or a previous stage of the first circuit.

It is possible to make the plurality of signals include a first signal and a second signal, the second signal being faster than the first signal, and to make the detection unit include a second detection circuit configured to detect rise of the input signal, a detector circuit configured to wave-detect a detection signal, the detection signal being output from the second detection circuit, and a second hysteresis comparator configured to compare a detector signal output from the detector circuit and a predetermined reference level and output a comparison result as a detection result of the second signal.

It is possible to make the input signal be a differential signal, and it is possible to make the detection unit further include a third hysteresis comparator configured to compare a positive-side signal and a negative-side signal of the input signal and to make the second detection circuit detect the rise of the input signal, the input signal being converted into a digital signal by the third hysteresis comparator.

It is possible to further provide a sending unit configured to convert the output signal into an optical signal and send the optical signal.

It is possible to further provide a sending unit configured to convert the output signal into an optical signal and send the optical signal.

It is possible to further provide a receiving unit configured to receive a millimeter-wave signal and extract a baseband signal from the millimeter-wave signal, and it is possible to make the detection unit detect the plurality of signals included in the baseband signal, and to make the output control unit control output of the output signal, the output signal including the plurality of signals included in the baseband signal.

It is possible to further provide a receiving unit configured to receive an optical signal and convert the optical signal into an electric signal, and it is possible to make the output control unit control output of the output signal, the output signal including the plurality of signals included in the electric signal.

It is possible to make the plurality of signals include LFPS (Low Frequency Periodic Signaling).

According to the first aspect of the present technology, there is provided a transmission method including the steps of: detecting each of a plurality of signals from an input signal, the plurality of signals having different speeds; and controlling output of an output signal on a basis of detection results of the plurality of signals, the output signal including the plurality of signals.

According to a second aspect of the present technology, there is provided a filter circuit including at least one of a first circuit and a second circuit, the first circuit including pulse width reducers that are connected in cascade and each shorten a pulse width of a signal, the second circuit including pulse width expanders that are connected in cascade and each expand the pulse width of the signal.

It is possible to make the second circuit be provided at a subsequent stage or a previous stage of the first circuit.

In the first aspect of the present technology, each of the plurality of signals having different speeds is detected from an input signal, and on the basis of detection results of the plurality of signals, output of an output signal including the plurality of signals is controlled.

In the second aspect of the present technology, a pulse having a width narrower than a predetermined width of a positive logic or negative logic signal is removed.

Advantageous Effects of Invention

According to the first aspect of the present technology, it is possible to transmit a signal with high quality, the signal including a plurality of signals having different speeds.

According to the second aspect of the present technology, it is possible to remove a high-speed signal having a narrow pulse width by a simple circuit configuration.

MODE(S) FOR CARRYING OUT THE INVENTION

Hereinafter, a mode for carrying out the present technology (hereinafter, described as embodiment) will be described. It should be noted that description will be given in the following order.

1. Embodiment
2. Examples

1. Embodiment

{Configuration Example of Transmission Apparatus 1}

Figure 1:
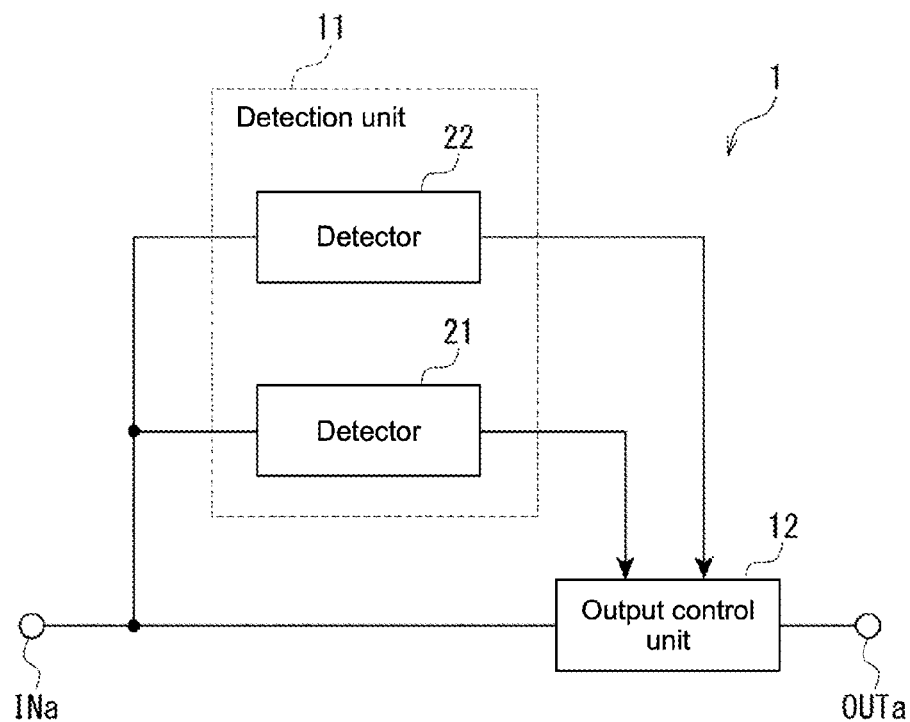
FIG. 1 is a block diagram showing one embodiment of a transmission apparatus to which the present technology is applied.

FIG. 1 is a block diagram showing one embodiment of a transmission apparatus 1 to which the present technology is applied. The transmission apparatus 1 is used for, for example, an optical transmission apparatus that converts a USB 3.0 signal into an optical signal for transmission or a millimeter-wave transmission apparatus that converts the USB 3.0 signal into a millimeter-wave signal for transmission.

As described above, in the USB 3.0, two types of signals, i.e., a low-speed control signal (LFPS) and a high-speed transmission signal are transmitted. The low-speed control signal is a signal having a long period of 20 ns to 100 ns and transmitted for a predetermined time period. The shortest low-speed control signal is a control signal having two pulses at minimum, which is called LFPS ping. Meanwhile, the high-speed transmission signal is a signal of 5 Gbps used to transmit information.

Further, as described above, in the USB 3.0, the following specifications are determined: a time period without transmission signal is set to an Electrical Idle state. In the Electrical Idle state, it is recommended that an output signal is kept at a predetermined level and noise in the transmission path is reduced.

The transmission apparatus 1 includes a detection unit 11 and an output control unit 12. The detection unit 11 includes a detector 21 and a detector 22.

An input signal is input from an input terminal INa to the detector 21, the detector 22, and the output control unit 12. The input signal is a serial differential signal conforming to the USB 3.0.

The detector 21 detects a low-speed control signal, which is included in the input signal, and supplies a signal indicating a detection result (hereinafter, described as detection signal 1) to the output control unit 12.

The detector 22 detects a high-speed transmission signal, which is included in the input signal, and supplies a signal indicating a detection result (hereinafter, described as detection signal 2) to the output control unit 12.

The output control unit 12 controls output of an output signal from an output terminal OUTa on the basis of the detection signal 1 and the detection signal 2. The output signal is a signal obtained by enhancing the quality of the input signal. Similarly to the input signal, the output signal includes the low-speed control signal and the high-speed transmission signal.

{Configuration Example of Detector 21}

Figure 2:
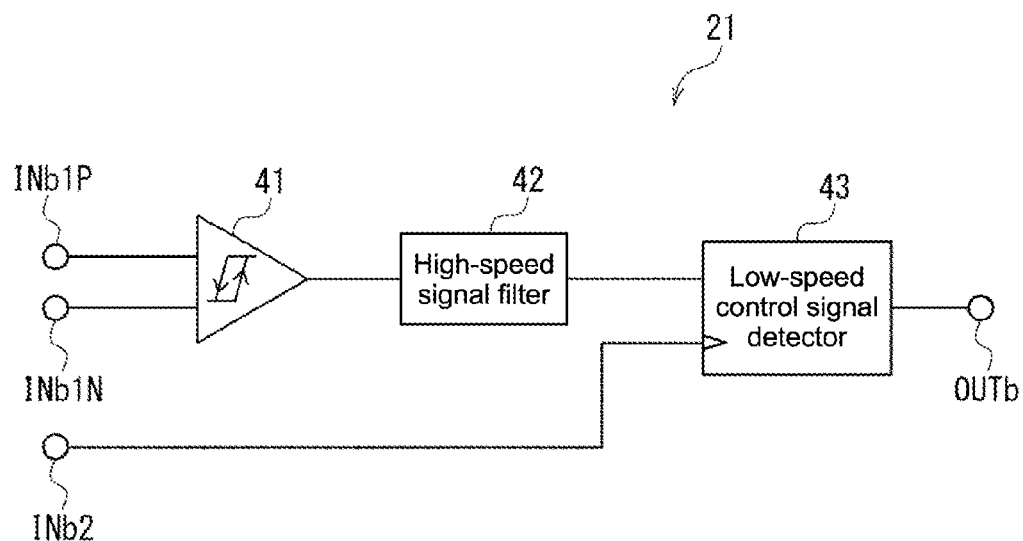
FIG. 2 is a block diagram showing a configuration example of a detector that detects a low-speed control signal.

FIG. 2 shows a configuration example of the detector 21. The detector 21 includes a hysteresis comparator 41, a high-speed signal filter 42, and a low-speed control signal detector 43.

To the hysteresis comparator 41, a positive-side signal of the input signal serving as a differential signal is input from an input terminal INb1P, and a negative-side signal of the input signal is input from an input terminal INb1N. The hysteresis comparator 41 compares the positive-side signal and the negative-side signal of the input signal and outputs a signal indicating a comparison result. With this configuration, the input signal is converted into a digital signal and noise is removed. The hysteresis comparator 41 then supplies the input signal converted into the digital signal to the high-speed signal filter 42.

The high-speed signal filter 42 removes the high-speed transmission signal from the input signal converted into the digital signal, and supplies the input signal, from which the high-speed transmission signal is removed, to the low-speed control signal detector 43.

The low-speed control signal detector 43 samples the input signal in synchronization with a clock signal, which is input from the inside or outside of the transmission apparatus 1 to an input terminal INb2, and detects the low-speed control signal included in the input signal. The low-speed control signal detector 43 outputs the detection signal 1, which indicates a detection result, from an output terminal OUTb and supplies the detection signal 1 to the output control unit 12.

In a case where the input signal has a predetermined threshold value or more, the low-speed control signal detector 43 sets the detection signal 1 to High level. In a case where the input signal has a value less than the predetermined threshold value, the low-speed control signal detector 43 sets the detection signal 1 to Low level. Here, since the high-speed transmission signal is removed from the input signal by the high-speed signal filter 42, the detection signal 1 is set to High level in a transmission time period for the low-speed control signal.

{Configuration Example of High-Speed Signal Filter 42}

Figure 3:
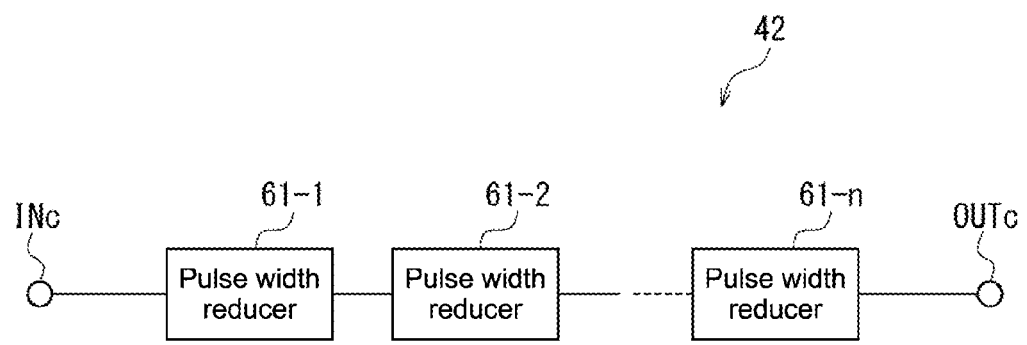
FIG. 3 is a block diagram showing a configuration example of a high-speed signal filter.

FIG. 3 shows a configuration example of the high-speed signal filter 42. The high-speed signal filter 42 includes pulse width reducers 61-1 to 61-$n$ that are connected in series cascade.

It should be noted that in a case where the pulse width reducers 61-1 to 61-$n$ are not necessary to be distinguished from one another, the pulse width reducers 61-1 to 61-$n$ are hereinafter described simply as pulse width reducer 61.

Figure 4:
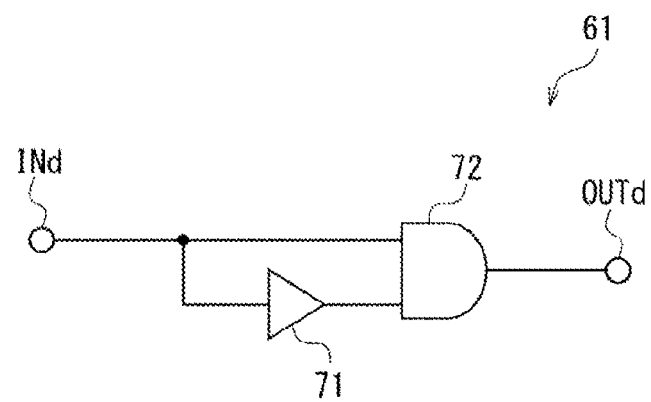
FIG. 4 is a circuit diagram showing a configuration example of a pulse width reducer.

FIG. 4 shows a configuration example of a circuit of the pulse width reducer 61. The pulse width reducer 61 includes a delay element 71 and an AND circuit 72.

The signal input from an input terminal INd is supplied to the delay element 71 and the AND circuit 72. The delay element 71 supplies the signal to the AND circuit 72 with delay of a predetermined time. The AND circuit 72 outputs, from an output terminal OUTd, a signal indicating a logical conjunction of the signal from the input terminal INd and the signal from the delay element 71. With this configuration, the signal input to the pulse width reducer 61 is output with the pulse width being shortened for a delay time by the delay element 71.

Therefore, in the high-speed signal filter 42, the pulse width of the signal input from an input terminal INc is shortened each time the signal passes through the pulse width reducer 61. A pulse having a width narrower than the predetermined width is removed from the signal, and such a signal is output from an output terminal OUTc. Therefore, by appropriately setting the amount of delay by the delay element 71 of the pulse width reducer 61 and the number of pulse width reducers 61, the high-speed transmission signal having high speed and a narrow pulse width can be removed from the input signal while leaving the low-speed control signal having low speed and a wide pulse width in a simple circuit configuration.

{Configuration Example of Detector 22}

Figure 5:
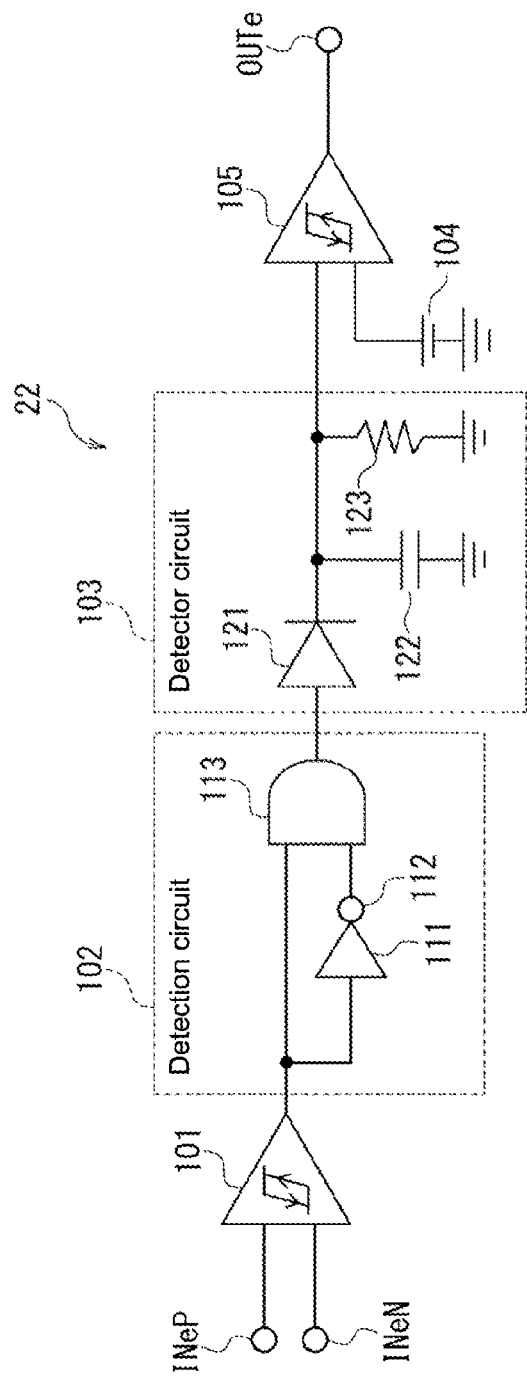
FIG. 5 is a circuit diagram showing a configuration example of a detector that detects a high-speed transmission signal.

FIG. 5 shows a configuration example of the detector 22 of the transmission apparatus 1. The detector 22 includes a hysteresis comparator 101, a detection circuit 102, a detector circuit 103, a power supply 104, and a hysteresis comparator 105. The detection circuit 102 includes a delay element 111, an inverter 112, and an AND circuit 113. The detector circuit 103 includes a diode 121, a capacitor 122, and a resistor 123.

An input terminal of the hysteresis comparator 101 is connected to input terminals INeP and INeN, and an output terminal thereof is connected to an input terminal of the delay element 111 and an input terminal of the AND circuit 113. An output terminal of the delay element 111 is connected to an input terminal of the AND circuit 113 via the inverter 112. An output terminal of the AND circuit 113 is connected to an anode of the diode 121. The capacitor 122 is connected between a cathode of the diode 121 and the ground. The resistor 123 is connected between the cathode of the diode 121 and the ground. A positive (+) terminal of the power supply 104 is connected to an input terminal of the hysteresis comparator 105, and a negative (−) terminal thereof is connected to the ground. The input terminal of the hysteresis comparator 105 is connected to the cathode of the diode 121, and an output terminal thereof is connected to an output terminal OUTe.

To the hysteresis comparator 101, the positive-side signal of the input signal is input from the input terminal INeP, and the negative-side signal of the input signal is input from the input terminal INeN. Similarly to the hysteresis comparator 41 of the detector 21, the hysteresis comparator 101 converts the input signal into a digital signal and also removes noise therefrom. The hysteresis comparator 101 supplies the input signal converted into the digital signal to the delay element 111 and the AND circuit 113.

The detection circuit 102 detects rise of the input signal converted into the digital signal and outputs a signal indicating a detection result (hereinafter, described as rise detection signal). Specifically, when the input signal is changed from Low level to High level, the detection circuit 102 outputs a rise detection signal that is set to High level for a delay time by the delay element 111.

The detector circuit 103 wave-detects the rise detection signal. In other words, the detector circuit 103 outputs a detector signal indicating a voltage corresponding to charge accumulated by the capacitor 122 due to the rise detection signal.

In a time period in which the level of the input signal changes in a short period (for example, transmission time period for high-speed transmission signal), the detector signal has a value that gradually increases from Low level and is then kept as it is after reaching predetermined High level. Subsequently, when a time period in which the level of the input signal changes in a long period (for example, transmission time period for low-speed control signal) or a time period in which the level of the input signal is constant (for example, time period of Electrical Idle state) follows, the level of the detector signal gradually decreases and is kept as it is after reaching predetermined Low level. In such a manner, the detector signal takes predetermined time to rise from Low level to High level and to fall from High level to Low level.

The hysteresis comparator 105 compares the detector signal from the detector circuit and a reference level (reference voltage) determined by the power supply 104. The hysteresis comparator 105 then outputs a signal indicating a comparison result from the output terminal OUTe, as the detection signal 2 indicating a detection result of the high-speed transmission control signal.

Here, when the detector signal has a reference level $+\Delta L1$ or more, the detection signal 2 is set to High level, and when the detector signal has a reference level $-\Delta L2$ or less, the detection signal 2 is set to Low level. It should be noted that $\Delta 1$ and $\Delta 2$ are set to predetermined values.

With this configuration, the detection signal 2 is set to High level in the time period in which the input signal changes in a short period, and set to Low level in the time period in which the input signal changes in a long period or the time period in which the input signal has a constant level. Therefore, the detection signal 2 is, for example, set to High level in the transmission time period for the high-speed transmission signal, in which the input signal changes in a short period, and set to Low level in the other time periods.

However, as described above, since the detector signal takes time to rise, it takes predetermined time from the start of the transmission time period for the high-speed transmission signal to when the detection signal 2 is set to High level. Similarly, since the detector signal takes time to fall, it takes predetermined time from the end of the transmission time period for the high-speed transmission signal to when the detection signal 2 is set to Low level.

{Configuration Example of Output Control Unit 12}

Figure 6:
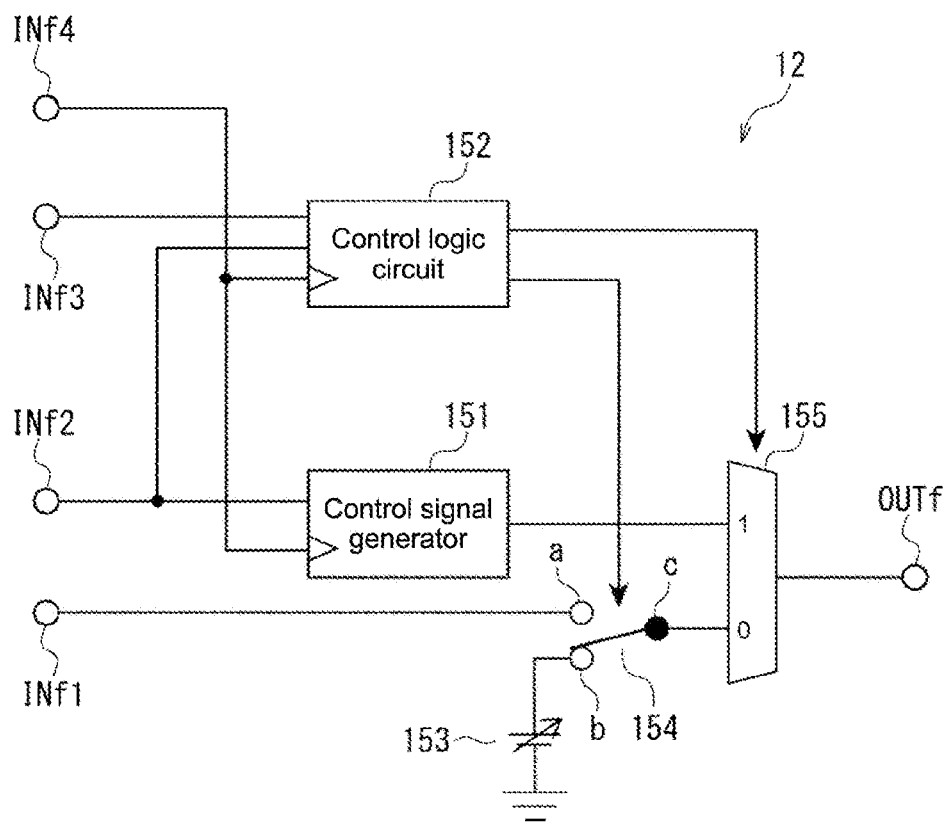
FIG. 6 is a diagram showing a configuration example of an output control unit.

FIG. 6 shows a configuration example of the output control unit 12. The output control unit 12 includes a control signal generator 151, a control logic circuit 152, a variable power supply 153, a switch 154, and a selector 155.

The input signal is input from the input terminal INa of FIG. 1 to an input terminal INf1. The detection signal 1 is input from the detector 21 to an input terminal INf2. The detection signal 2 is input from the detector 22 to an input terminal INf3. A clock signal with a predetermined frequency is input from the inside or outside of the transmission apparatus 1 to an input terminal INf4.

The control signal generator 151 generates a low-speed control signal by the clock signal supplied from the input terminal INf4 while the detection signal 1 supplied from the input terminal INf2 is at High level, and supplies the generated low-speed control signal to an input terminal 1 of the selector 155. Meanwhile, the control signal generator 151 stops generation and supply of the low-speed control signal while the detection signal 1 is at Low level.

The control logic circuit 152 controls output of a switch control signal, which is supplied to the switch 154, on the basis of the detection signal 2 supplied from the input terminal INf3. Specifically, the control logic circuit 152 sets the switch control signal to High level when the detection signal 2 is at High level, and sets the switch control signal to Low level when the detection signal 2 is at Low level.

Further, the control logic circuit 152 controls output of a selector signal, which is supplied to the selector 155, on the basis of the detection signal 1 supplied from the input terminal INf2. Specifically, the control logic circuit 152 sets the selector signal to High level when the detection signal 1 is at High level, and sets the selector signal to Low level when the detection signal 1 is at Low level.

The variable power supply 153 is a power supply whose output voltage is variable, and includes a positive (+) terminal connected to a terminal b of the switch 154 and a negative (−) terminal connected to the ground. The variable power supply 153 determines a level of the output signal in an Electrical Idle state (hereinafter, described as idle level).

A terminal a of the switch 154 is connected to the input terminal INf1, and a terminal c thereof is connected to an input terminal 0 of the selector 155. The switch 154 changes a state of a contact by the switch control signal from the control logic circuit 152. Specifically, when the switch control signal is at High level, the contact of the switch 154 is connected to the terminal a, and when the switch control signal is at Low level, the contact of the switch 154 is connected to the terminal b.

On the basis of the selector signal from the control logic circuit 152, the selector 155 selects either one of a selector input signal 1 input to the input terminal 1 and a selector input signal 0 input to the input terminal 0, and outputs the selected signal. Specifically, the selector 155 outputs the selector input signal 1 when the selector signal is at High level, and outputs the selector input signal 0 when the selector signal is at Low level. The signal output from the selector 155 is output, as an output signal, to an apparatus at a subsequent stage of the transmission apparatus 1 via an output terminal OUTf and the output terminal OUTa of FIG. 1.

{Operation of Transmission Apparatus 1}

Figure 7:
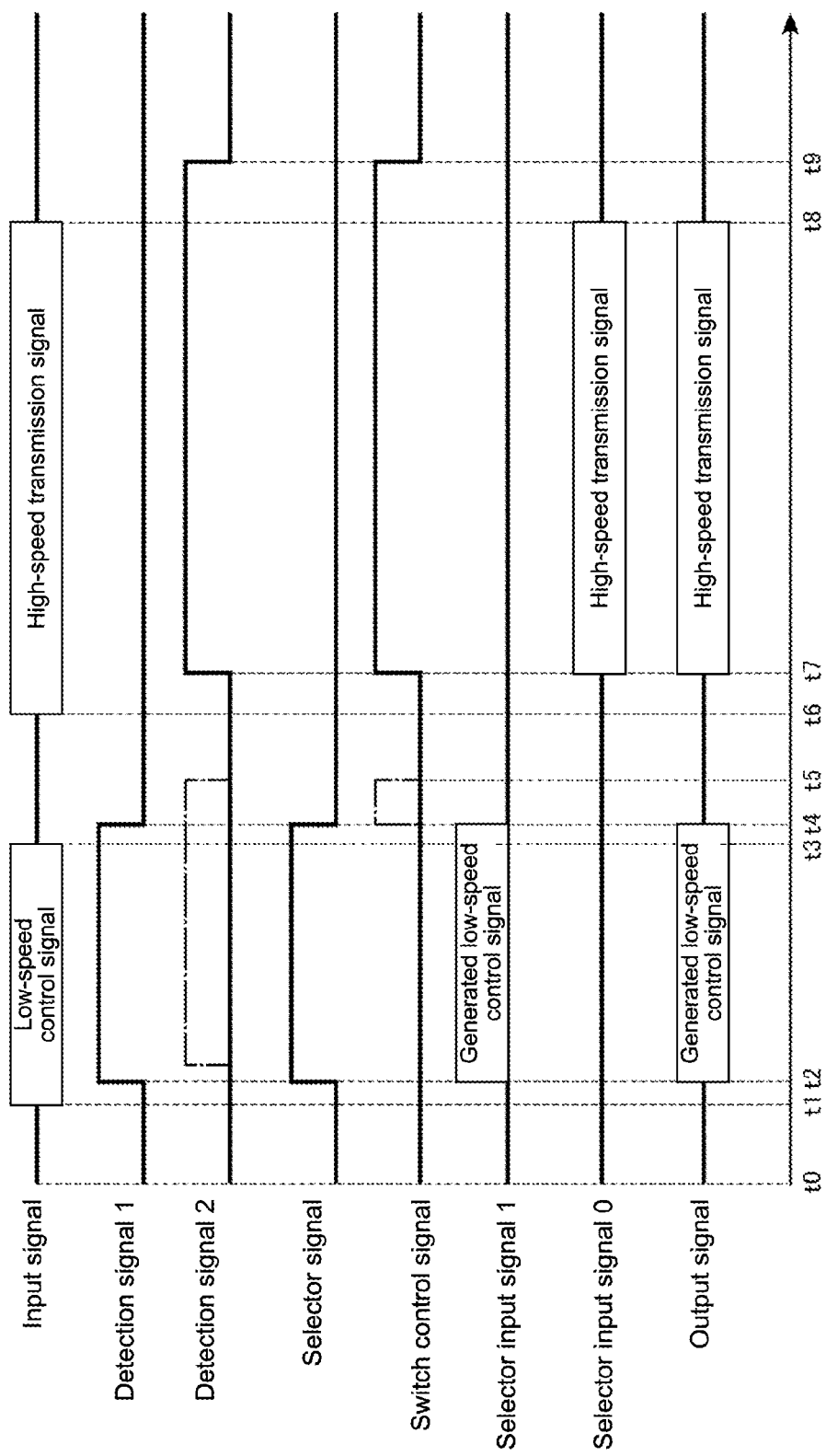
FIG. 7 is a timing chart for describing an operation of the transmission apparatus.

Next, an operation of the transmission apparatus 1 will be described according to a timing chart of FIG. 7. It should be noted that in the timing chart of FIG. 7, chronological changes of the input signal, the detection signal 1, the detection signal 2, the selector signal, the switch control signal, the selector input signal 1, the selector input signal 0, and the output signal are shown from the top.

At time t0, the input signal is in the Electrical Idle state and set to a predetermined idle level. With this configuration, the detection signal 1, which is input from the detector 21 to the control signal generator 151 and the control logic circuit 152, is set to Low level. The control signal generator 151 then enters a state where the low-speed control signal to the input terminal 1 of the selector 155 is stopped. Further, the control logic circuit 152 sets the selector signal, which is input to the selector 155, to Low level. With this configuration, the selector 155 enters a state where the selector input signal 0 input to the input terminal 0 is output.

Further, the detection signal 2, which is input from the detector 22 to the control logic circuit 152, is set to Low level. With this configuration, the control logic circuit 152 sets the switch control signal, which is input to the switch 154, to Low level. As a result, the contact of the switch 154 is connected to the terminal b, and the selector input signal 1, which is input to the input terminal 0 of the selector 155, is set to the idle level that is determined by the variable power supply 153.

With this configuration, the output signal at the idle level determined by the variable power supply 153 is output from the transmission apparatus 1. Further, even when the input signal includes noise in the time period of the Electrical Idle state, the output signal is kept at the idle level without being affected by the noise.

Next, at time t1, in a case where transmission of the low-speed control signal is started, the detection signal 1 becomes High level at time t2 at which a very short time has elapsed from time t1. With this configuration, the control signal generator 151 starts to generate the low-speed control signal and inputs the generated low-speed control signal to the input terminal 1 of the selector 155. It should be noted that the low-speed control signal is a signal having a predetermined pattern, and the control signal generator 151 generates a signal having that predetermined pattern.

Further, the control logic circuit 152 sets the selector signal to High level, and the selector 155 starts to output the selector input signal 1. With this configuration, the low-speed control signal generated by the control signal generator 151 is output as output signal from the transmission apparatus 1.

Next, at time t3, in a case where the transmission of the low-speed control signal is terminated and the signal returns to the Electrical Idle state, the detection signal 1 becomes Low level at time t4 at which a very short time has elapsed from time t3. With this configuration, the control signal generator 151 terminates the generation of the low-speed control signal and stops supply of the low-speed control signal to the input terminal 1 of the selector 155.

Further, the control logic circuit 152 sets the selector signal to Low level, and the selector 155 starts to output the selector input signal 0. With this configuration, the output signal at the idle level is output from the transmission apparatus 1. Further, even when the input signal includes noise in the time period of the Electrical Idle state, the output signal is kept at the idle level without being affected by the noise.

Next, at time t6, in a case where transmission of the high-speed transmission signal is started, the detection signal 2 becomes High level at time t7 at which a predetermined time has elapsed from time t6. With this configuration, the control logic circuit 152 sets the switch control signal to High level, and the contact of the switch 154 is connected to the terminal a. The input signal input from the input terminal INf1 is then input to the input terminal 0 of the selector 155.

Meanwhile, the control logic circuit 152 keeps the selector signal at Low level, and the selector 155 keeps the output of the selector input signal 0. Therefore, the input signal is output as it is from the transmission apparatus 1. More specifically, because of the transmission time period for the high-speed transmission signal, the high-speed transmission signal included the input signal is output from the transmission apparatus 1.

It should be noted that the time between time t6 and time t7 corresponds to a detection delay time of the high-speed transmission signal in the detector 22, and data of the high-speed transmission signal at a head portion thereof is lost for that delay time. However, in general, sufficiently-long training data is disposed at the head portion of the data of the high-speed serial transmission signal. Therefore, even if the data of the high-speed transmission signal at the head portion is lost, problems do not particularly occur.

In this connection, in the case of the USB 3.0, a training data time period of 2 ms is disposed at the head of the high-speed transmission signal. Meanwhile, the detection delay time of the high-speed transmission signal in the detector 22 is about several 100 ns.

Next, at time t8, in a case where the transmission of the high-speed transmission signal is terminated and the signal returns to the Electrical Idle state, the detection signal 2 becomes Low level at time t9 at which a predetermined time has elapsed from time t8. With this configuration, the control logic circuit 152 sets the switch control signal to Low level, and the contact of the switch 154 is connected to the terminal b. The selector input signal 0 input to the input terminal 0 of the selector 155 is then set to the idle level.

Meanwhile, the control logic circuit 152 keeps the selector signal at Low level, and the selector 155 keeps the output of the selector input signal 0. Therefore, the output signal at the idle level is output from the transmission apparatus 1. Further, even when the input signal includes noise in the time period of the Electrical Idle state, the output signal is kept at the idle level without being affected by the noise.

As described above, the transmission apparatus 1 can receive the input signal conforming to the USB 3.0 standards and transmit a high-quality output signal to an apparatus at a subsequent stage, the output signal having a smaller amount of noise than that of the received input signal. More specifically, the transmission apparatus 1 can transmit a signal, as output signal, to an apparatus at a subsequent stage, the signal being obtained by removing noise from a low-speed control signal of the input signal and a signal in the time period of the Electrical Idle state.

Further, since the low-speed control signal is generated inside, a very short signal such as LFPS ping can also be reliably transmitted to an apparatus at a subsequent stage without being missed.

Furthermore, since the input signal from which noise is removed is converted into a digital signal, and the low-speed control signal and the high-speed transmission signal are then detected, even when the amplitude of the input signal is small, the low-speed control signal and the high-speed transmission signal can be reliably detected and transmitted to an apparatus at a subsequent stage.

It should be noted that in a case where the detector 22 detects not only the high-speed transmission signal but also the low-speed control signal, the detection signal 2, which is output from the detector 22 in a transmission time period for the low-speed control signal, changes as indicated by a chain line. In other words, a time period during which the detection signal 2 becomes High level is delayed for a predetermined time from a time period during which the detection signal 1 becomes High level.

In response to this, the control logic circuit 152 sets the switch control signal to Low level in a time period during which both the detection signal 1 and the detection signal 2 are at High level. Further, even after the detection signal 1 becomes Low level at time t4, the control logic circuit 152 keeps the switch control signal at Low level, at minimum during a time period to time t5 at which the detection signal 2 becomes Low level, even if the detection signal 2 is at High level.

With this configuration, the switch control signal is set to High level for only a short time period, as indicated by the chain line, after the transmission time period for the low-speed control signal is terminated. Thus, the input signal in the Electrical Idle state is prevented from being output as the output signal.

2. Modified Examples

Hereinafter, modified examples of the above-mentioned embodiment of the present technology will be described.

{Modified Example of Transmission Apparatus 1}

Figure 8:
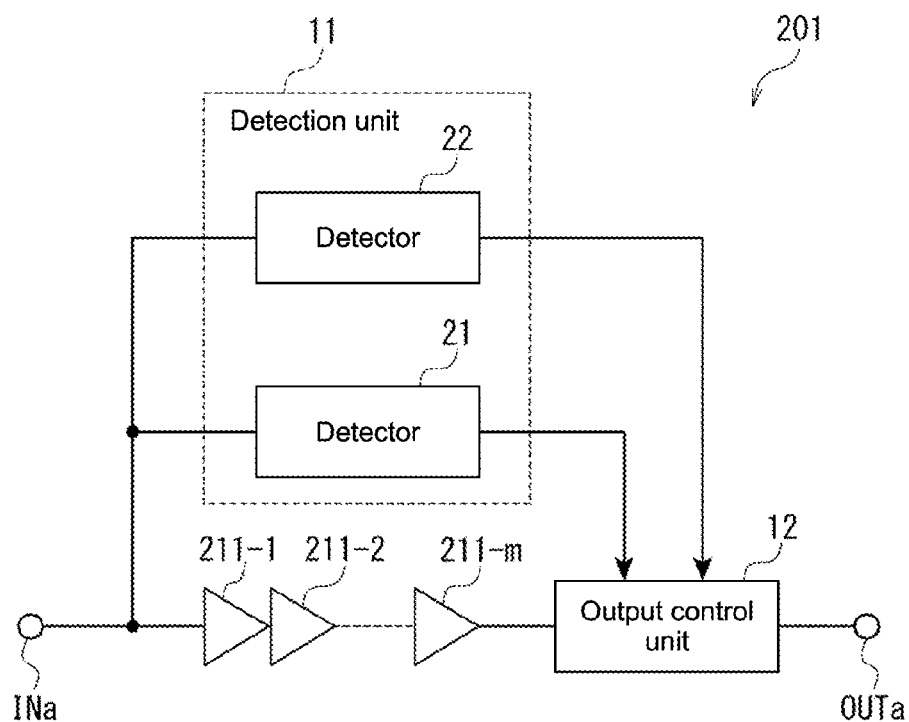
FIG. 8 is a block diagram showing a first modified example of the transmission apparatus to which the present technology is applied.

FIG. 8 is a block diagram showing a configuration example of a transmission apparatus 201 as a first modified example of the transmission apparatus 1. It should be noted that in the figure, parts corresponding to those in FIG. 1 are denoted by the same reference symbols.

The transmission apparatus 201 is different from the transmission apparatus 1 of FIG. 1 in that buffers 211-1 to 211-m are provided.

The buffers 211-1 to 211-m are connected between the input terminal INa and the output control unit 12. Each of the buffers 211-1 to 211-m amplifies the amplitude of the input signal. With this configuration, the transmission apparatus 201 can amplify the amplitude of the high-speed transmission signal and output a resultant signal.

Figure 9:
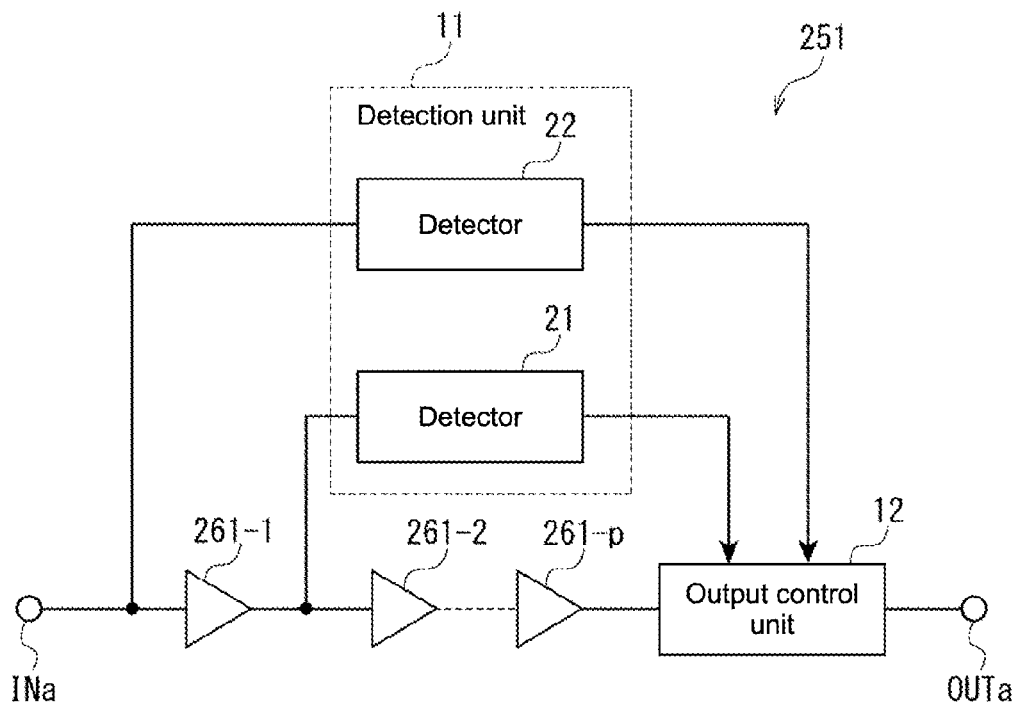
FIG. 9 is a block diagram showing a second modified example of the transmission apparatus to which the present technology is applied.

FIG. 9 is a block diagram showing a configuration example of a transmission apparatus 251 as a second modified example of the transmission apparatus 1. It should be noted that in the figure, parts corresponding to those in FIG. 1 are denoted by the same reference symbols.

The transmission apparatus 251 is different from the transmission apparatus 1 of FIG. 1 in that a buffer 261-1 is provided between the input terminal INa and the detector 21, and the buffers 261-1 to 261-p are provided between the input terminal INa and the output control unit 12.

Compared to the transmission apparatus 201 of FIG. 8, the transmission apparatus 251 amplifies not only the amplitude of the input signal, which is input to the output control unit 12, but also the amplitude of the input signal, which is input to the detector 21. This can improve detection accuracy of the low-speed control signal by the detector 21.

It should be noted that the amplitude of the input signal that is input to the detector 22 may also be amplified, though not shown in the figure. Alternatively, the amplitude of the input signal that is input to the detector 22 may be amplified, but the amplitude of the input signal that is input to the detector 21 may not be amplified.

{Modified Example of Detection Unit 11}

Figure 10:
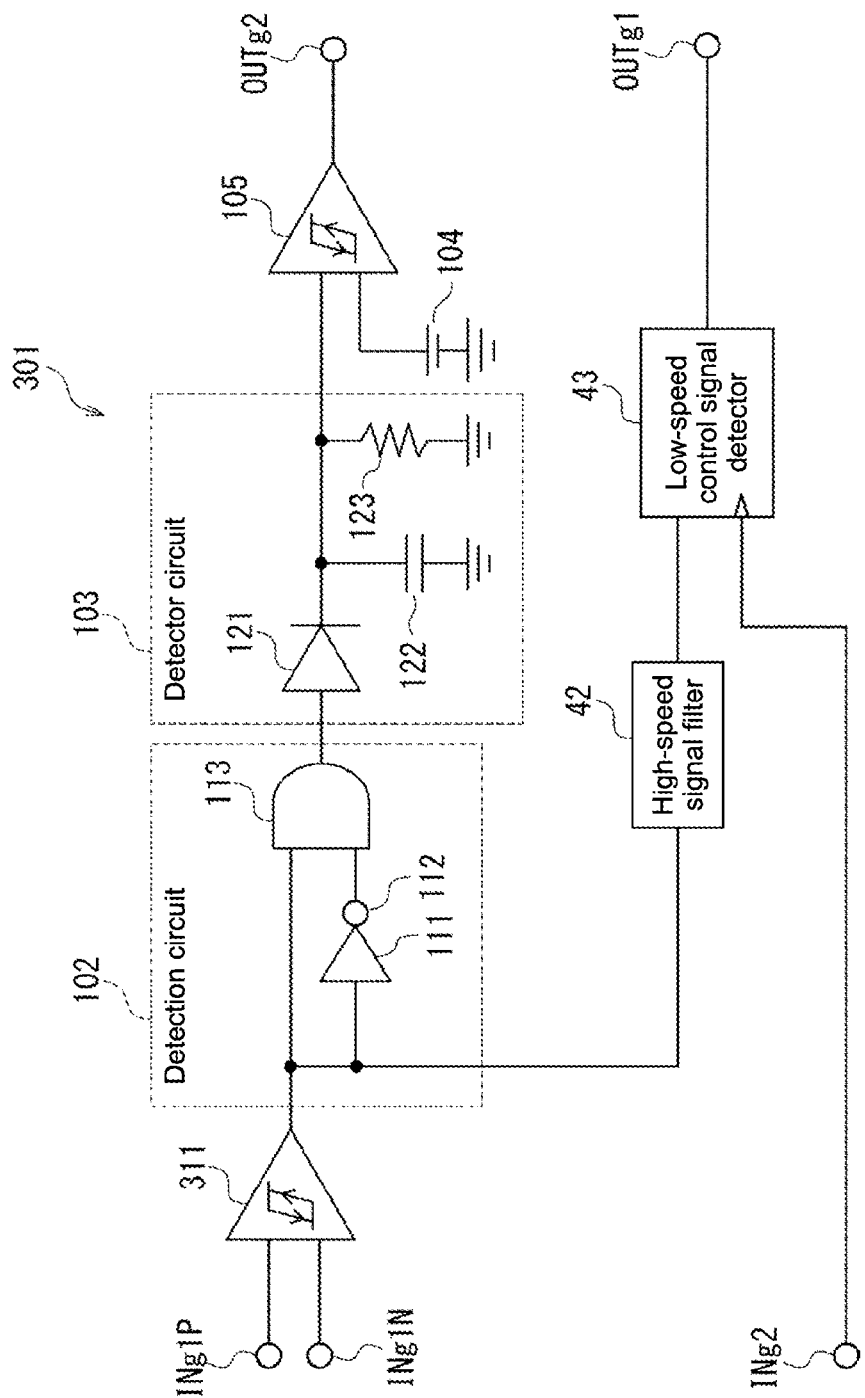
FIG. 10 is a diagram showing a modified example of a detection unit of the transmission apparatus.

FIG. 10 is a block diagram showing a configuration example of a detection unit 301 as a modified example of the detection unit 11. It should be noted that in the figure, parts corresponding to those in FIGS. 2 and 5 are denoted by the same reference symbols.

In the detection unit 301, the hysteresis comparator 41 of the detector 21 and the hysteresis comparator 101 of the detector 22 are made common. Specifically, a hysteresis comparator 311 is provided instead of the hysteresis comparator 41 and the hysteresis comparator 101.

To the hysteresis comparator 311, a positive-side signal of the input signal is input from an input terminal INg1P, and a negative-side signal of the input signal is input from an input terminal INg1N. Similarly to the hysteresis comparator 41 and the hysteresis comparator 101, the hysteresis comparator 311 converts the input signal into a digital signal and removes noise therefrom. The hysteresis comparator 311 supplies the input signal converted into the digital signal to the high-speed signal filter 42, the delay element 111, and the AND circuit 113.

{Modified Example of High-speed Signal Filter 42}

Figure 11:
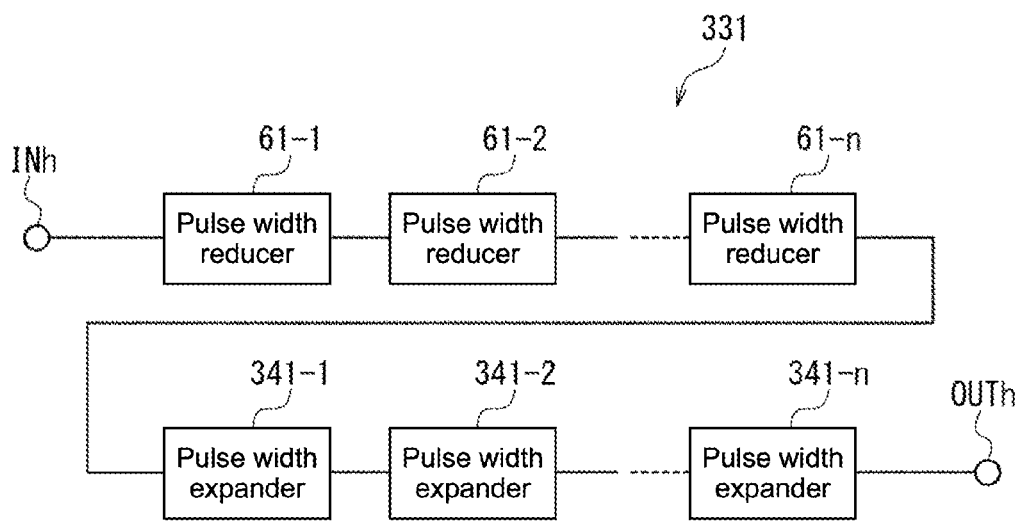
FIG. 11 is a block diagram showing a first modified example of the high-speed signal filter.

FIG. 11 shows a configuration example of a high-speed signal filter 331 as a first modified example of the high-speed signal filter 42.

The high-speed signal filter 331 is different from the high-speed signal filter 42 of FIG. 3 in that pulse width expanders 341-1 to 341-n that are connected in series cascade are provided at a subsequent stage of the pulse width reducers 61-1 to 61-n. It should be noted that in a case where the pulse width expanders 341-1 to 341-n are not necessary to be distinguished from one another, the pulse width expanders 341-1 to 341-n are hereinafter described simply as pulse width expander 341.

Figure 12:
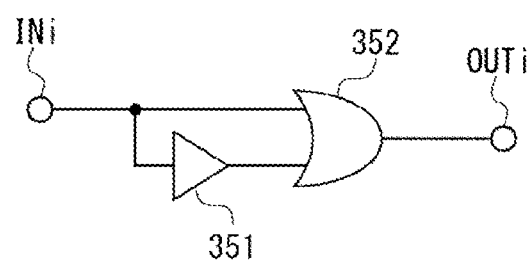
FIG. 12 is a circuit diagram showing a configuration example of a pulse width expander.

FIG. 12 shows a configuration example of a circuit of the pulse width expander 341. The pulse width expander 341 includes a delay element 351 and an OR circuit 352.

The signal input from an input terminal INi is supplied to the delay element 351 and the OR circuit 352. The delay element 351 supplies the signal to the OR circuit 352 with delay of a predetermined time. The OR circuit 352 outputs, from an output terminal OUTi, a signal indicating a logical disjunction of the signal from the input terminal INi and the signal from the delay element 351. With this configuration, the signal input to the pulse width expander 341 is output with the pulse width being expanded for a delay time by the delay element 351.

Therefore, in the high-speed signal filter 331, the pulse width of the signal input from an input terminal INh is shortened each time the signal passes through the pulse width reducer 61. A pulse having a width narrower than the predetermined width is then removed. Subsequently, the pulse width of the signal is elongated each time the signal passes through the pulse width expander 341. With this configuration, after the high-speed transmission signal is removed from the input signal, the pulse width of the low-speed control signal can be restored.

It should be noted that the number of pulse width reducers 61 and the number of pulse width expanders 341 may not necessarily coincide with each other in the high-speed signal filter 331.

Figure 13:
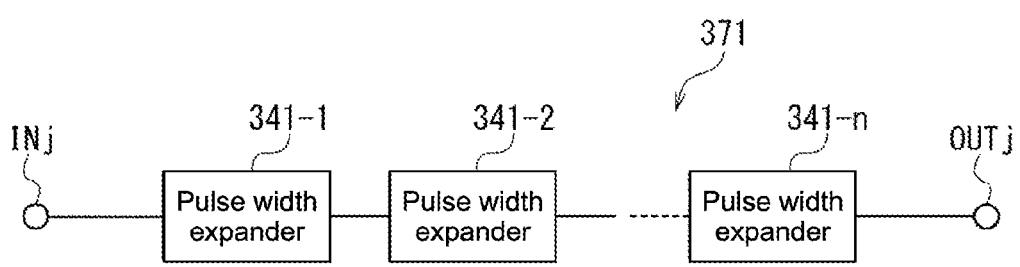
FIG. 13 is a block diagram showing a second modified example of the high-speed signal filter.

FIG. 13 shows a configuration example of a circuit of a high-speed signal filter 371 as a second modified example of the high-speed signal filter 42.

The high-speed signal filter 371 includes pulse width expanders 341-1 to 341-n that are connected in series cascade.

The high-speed signal filter 42 and the high-speed signal filter 331 described above are filters that remove a high-speed signal having a narrow pulse width from a positive logic signal, whereas the high-speed signal filter 371 is a filter that removes a high-speed signal having a narrow pulse width from a negative logic signal.

The pulse width expander 341 expands the pulse width of the positive logic signal. Conversely, the pulse width expander 341 shortens the pulse width of the negative logic signal. Therefore, in the high-speed signal filter 371, the pulse width of the negative logic signal input from an input terminal INj is shortened each time the signal passes through the pulse width expander 341. A signal from which a pulse having a width narrower than the predetermined width is removed is then output from an output terminal OUTj.

Therefore, the amount of delay by the delay element 351 of the pulse width expander 341 and the number of pulse width expanders 341 are appropriately set, so that in the negative logic input signal, the high-speed transmission signal having a narrow pulse width can be removed while leaving the low-speed control signal having a wide pulse width.

Figure 14:
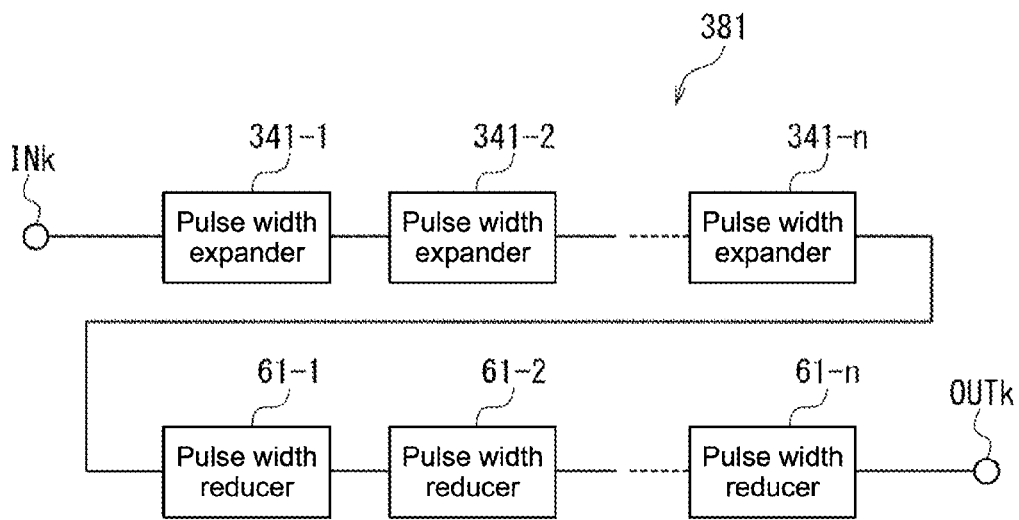
FIG. 14 is a block diagram showing a third modified example of the high-speed signal filter.

FIG. 14 shows a configuration example of a circuit of a high-speed signal filter 381 as a third modified example of the high-speed signal filter 42.

The high-speed signal filter 381 is different from the high-speed signal filter 371 of FIG. 13 in that the pulse width reducers 61-1 to 61-n that are connected in series cascade are provided at a subsequent stage of the pulse width expanders 341-1 to 341-n.

The pulse width reducer 61 shortens the pulse width of the positive logic signal. Conversely, the pulse width reducer 61 expands the pulse width of the negative logic signal. Therefore, in the high-speed signal filter 381, the pulse width of the negative logic signal input from an input terminal INj is shortened each time the signal passes through the pulse width expander 341. A pulse having a width narrower than the predetermined width is then removed. Subsequently, the pulse width of the signal is elongated each time the signal passes through the pulse width reducer 61. With this configuration, after the high-speed transmission signal is removed from the negative logic input signal, the pulse width of the low-speed control signal can be restored.

It should be noted that the number of pulse width reducers 61 and the number of pulse width expanders 341 may not necessarily coincide with each other in the high-speed signal filter 381.

3. Application Examples of the Present Technology

Next, application examples of the present technology will be described.

Figure 15:
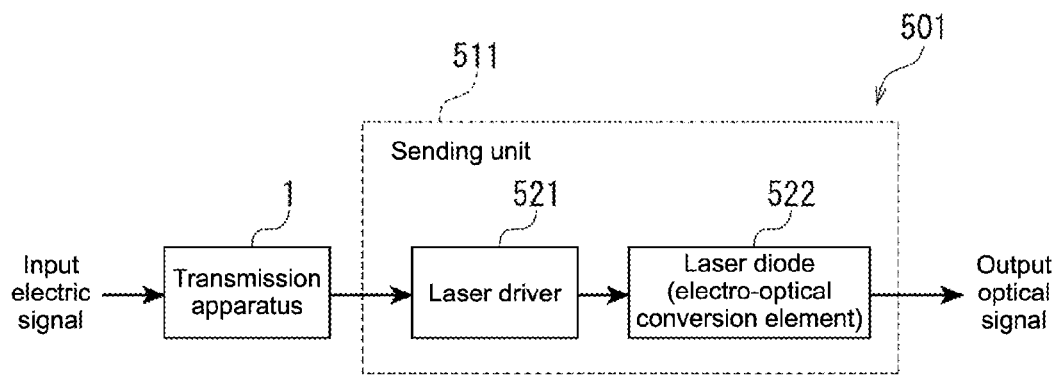
FIG. 15 is a block diagram showing a first embodiment of a sending apparatus to which the present technology is applied.

FIG. 15 shows an example in which the transmission apparatus 1 is used for a sending apparatus 501. The sending apparatus 501 is one of transmission apparatuses to send an optical signal.

The sending apparatus 501 includes the transmission apparatus 1 and a sending unit 511. The sending unit 511 includes a laser driver 521 and a laser diode (electro-optical conversion element) 522.

When an input electric signal that is the USB 3.0 signal is input, through the processing described above, the transmission apparatus 1 generates a high-quality output electric signal having a smaller amount of noise than that of the input electric signal, and supplies the output electric signal to the laser driver 521.

Under control of the laser driver 521, the laser diode 522 converts the output electric signal that is a differential signal into a digital signal, and further converts the digital signal into an optical signal (output optical signal) and outputs the optical signal.

In such a manner, the sending apparatus 501 can convert the USB 3.0 signal into an optical signal and send the optical signal. Further, the sending apparatus 501 can reduce the amount of noise of an optical signal to be sent and improve the quality thereof.

Figure 16:
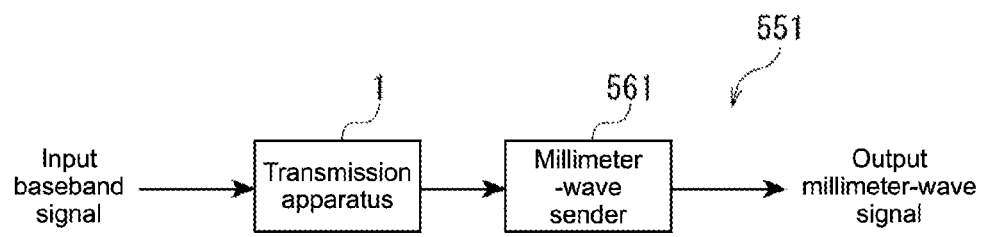
FIG. 16 is a block diagram showing a second embodiment of the sending apparatus to which the present technology is applied.

FIG. 16 shows an example in which the transmission apparatus 1 is used for a sending apparatus 551. The sending apparatus 551 is one of transmission apparatuses to send a millimeter-wave signal.

The sending apparatus 501 includes the transmission apparatus 1 and a millimeter-wave sending unit 561.

When an input baseband signal that is the USB 3.0 signal is input, through the processing described above, the transmission apparatus 1 generates a high-quality output baseband signal having a smaller amount of noise than that of the input baseband signal, and supplies the output baseband signal to the millimeter-wave sending unit 561.

The millimeter-wave sender 561 converts the output baseband signal that is a differential signal into a digital signal, and superimposes the output baseband signal converted into the digital signal on a frequency carrier wave, to generate an output millimeter-wave signal. The millimeter-wave sender 561 sends the generated output millimeter-wave signal.

In such a manner, the sending apparatus 551 can convert the USB 3.0 signal into a millimeter-wave signal and send the millimeter-wave signal. Further, the sending apparatus 551 can reduce the amount of noise of a millimeter-wave signal to be sent and improve the quality thereof.

Figure 17:
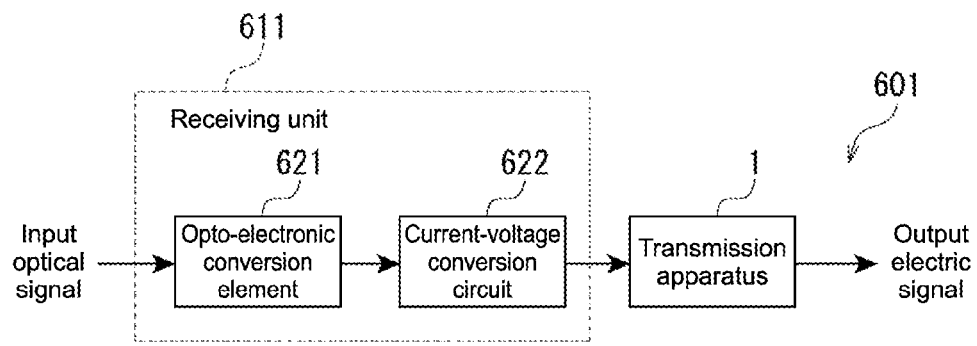
FIG. 17 is a block diagram showing a first embodiment of a receiving apparatus to which the present technology is applied.

FIG. 17 shows an example in which the transmission apparatus 1 is used for a receiving apparatus 601. The receiving apparatus 601 is one of transmission apparatuses to receive an optical signal.

The receiving apparatus 601 includes a receiving unit 611 and the transmission apparatus 1. The receiving unit 611 includes an opto-electronic conversion element 621 and a current-voltage conversion circuit 622.

An input optical signal received by a receiving apparatus (not shown) is input to the opto-electronic conversion element 621. The input optical signal is a signal obtained by converting the USB 3.0 signal into an optical signal. The opto-electronic conversion element 621 performs opto-electronic conversion on the input optical signal to obtain an electric signal and supplies the electric signal to the current-voltage conversion circuit 622.

The current-voltage conversion circuit 622 converts the electric signal produced by current, which is supplied from the opto-electronic conversion element 621, into an electric signal produced by voltage, and converts the digital signal into a differential signal, to supply the differential signal to the transmission apparatus 1.

Through the processing described above, the transmission apparatus 1 generates a high-quality output electric signal having a smaller amount of noise than that of the electric signal (USB 3.0 signal) supplied from the current-voltage conversion circuit 622. The transmission apparatus 1 outputs the generated output electric signal to an apparatus at a subsequent stage.

In such a manner, the receiving apparatus 601 can convert the received optical signal into the USB 3.0 signal and supply the USB 3.0 signal to an apparatus at a subsequent stage. Further, the receiving apparatus 601 can reduce the amount of noise of the USB 3.0 signal to be supplied to an apparatus at a subsequent stage, and improve the quality thereof.

Figure 18:
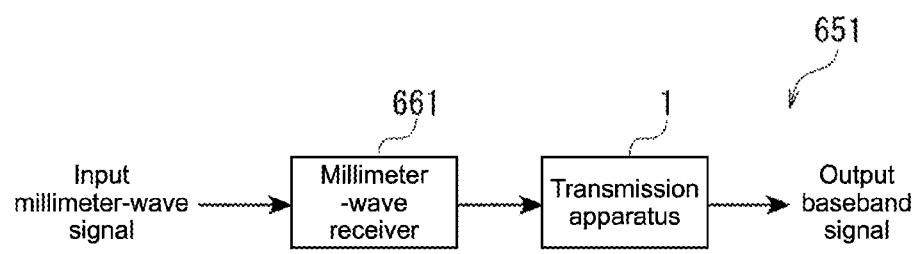
FIG. 18 is a block diagram showing a second embodiment of the receiving apparatus to which the present technology is applied.

FIG. 18 shows an example in which the transmission apparatus 1 is used for a receiving apparatus 651. The receiving apparatus 651 is one of transmission apparatuses to receive a millimeter-wave signal.

The receiving apparatus 651 includes a millimeter-wave receiver 661 and the transmission apparatus 1.

The millimeter-wave receiver 661 receives an input millimeter-wave signal. The input millimeter-wave signal is a signal obtained by superimposing the USB 3.0 signal converted into a digital signal, which serves as a baseband signal, on a predetermined frequency carrier wave. The millimeter-wave receiver 661 extracts the baseband signal from the input millimeter-wave signal and supplies the extracted baseband signal (USB 3.0 signal) to the transmission apparatus 1.

Through the processing described above, the transmission apparatus 1 generates a high-quality output baseband signal having a smaller amount of noise than that of the baseband signal supplied from the millimeter-wave receiver 661. The transmission apparatus 1 outputs the generated output baseband signal to an apparatus at a subsequent stage.

In such a manner, the receiving apparatus 651 can extract the USB 3.0 signal from the received millimeter-wave signal and supply the USB 3.0 signal to an apparatus at a subsequent stage. Further, the receiving apparatus 651 can reduce the amount of noise of the USB 3.0 signal to be supplied to an apparatus at a subsequent stage, and improve the quality thereof.

It should be noted that the transmission apparatus 201 or the transmission apparatus 251 can be used instead of the transmission apparatus 1 in each apparatus of FIGS. 15 to 18.

Further, in the above description, the example in which the present technology is applied to transmission of signals conforming to the USB 3.0 standards has been described, but the present technology can also be applied to transmission of signals conforming to other standards. For example, the present technology can be applied to a case of transmitting a serial signal including signals having different speeds, such as USB 3.1, or a serial signal kept at a predetermined level in a case where there is no transmission signal.

Furthermore, in the above description, the example in which a low-speed signal (for example, low-speed control signal) is generated in the transmission apparatus 1 and output has been described, but depending on the specifications or the like of signals, an input signal may be output as it is at the time of transmission of the low-speed signal similarly to a high-speed signal (for example, high-speed transmission signal). In an opposite manner, depending on the specifications of signals or the like, the high-speed signal may be generated in the transmission apparatus 1.

Moreover, the present technology can also be applied to transmission of a signal including three or more kinds of signals having different speeds. In this case, for example, the transmission apparatus may detect each of three or more kinds of a plurality of signals having different speeds from an input signal and, on the basis of detection results, control output of an output signal including the plurality of signals. Further, for example, during detection of any of the plurality of signals, the transmission apparatus may perform control to output a detected signal, and during no detection of any of the plurality of signals, the transmission apparatus may perform control to keep the output signal at a predetermined level. Furthermore, for example, during detection of a part of the plurality of signals (for example, low-speed control signal etc.), the transmission apparatus may perform control to generate a detected signal and output the generated signal, and during detection of the rest of the plurality of signals (for example, high-speed transmission signal etc.), the transmission apparatus may perform control to output the input signal. Moreover, for example, during detection of any of the plurality of signals, the transmission apparatus may perform control to output the input signal as it is.

It should be noted that the embodiments of the present technology are not limited to the embodiment described above, and can be variously modified without departing from the gist of the present technology.

Further, for example, the present technology can have the following configurations.

(1) A transmission apparatus, including:
a detection unit configured to detect each of a plurality of signals from an input signal, the plurality of signals having different speeds; and
an output control unit configured to control output of an output signal on a basis of detection results of the plurality of signals, the output signal including the plurality of signals.

(2) The transmission apparatus according to (1), in which
during detection of any of the plurality of signals, the output control unit performs control to output a detected signal, and
during no detection of any of the plurality of signals, the output control unit performs control to keep the output signal at a predetermined level.

(3) The transmission apparatus according to (2), in which
during detection of a part of the plurality of signals, the output control unit performs control to generate a detected signal and output a generated signal, and
during detection of the rest of the plurality of signals, the output control unit performs control to output the input signal.

(4) The transmission apparatus according to (2), in which
during detection of any of the plurality of signals, the output control unit performs control to output the input signal.

(5) The transmission apparatus according to any one of (1) to (4), in which
the plurality of signals include a first signal and a second signal, the second signal being faster than the first signal, and
the detection unit includes
a filter circuit configured to remove the second signal from the input signal, and
a first detection circuit configured to detect the first signal from the input signal from which the second signal is removed.

(6) The transmission apparatus according to (5), in which
the input signal is a differential signal,
the detection unit further includes a first hysteresis comparator configured to compare a positive-side signal and a negative-side signal of the input signal, and
the filter circuit removes the second signal from the input signal, the input signal being converted into a digital signal by the first hysteresis comparator.

(7) The transmission apparatus according to (5) or (6), in which
the filter circuit includes at least one of a first circuit and a second circuit, the first circuit including pulse width reducers that are connected in cascade and each shorten a pulse width of the signal, the second circuit including pulse width expanders that are connected in cascade and each expand the pulse width of the signal.

(8) The transmission apparatus according to (7), in which
the second circuit of the filter circuit is provided at a subsequent stage or a previous stage of the first circuit.

(9) The transmission apparatus according to any one of (1) to (8), in which
the plurality of signals include a first signal and a second signal, the second signal being faster than the first signal, and the detection unit includes
a second detection circuit configured to detect rise of the input signal,
a detector circuit configured to wave-detect a detection signal, the detection signal being output from the second detection circuit, and
a second hysteresis comparator configured to compare a detector signal output from the detector circuit and a predetermined reference level, and output a comparison result as a detection result of the second signal.

(10) The transmission apparatus according to (9), in which
the input signal is a differential signal,
the detection unit further includes a third hysteresis comparator configured to compare a positive-side signal and a negative-side signal of the input signal, and
the second detection circuit detects the rise of the input signal, the input signal being converted into a digital signal by the third hysteresis comparator.

(11) The transmission apparatus according to any one of (1) to (10), further including
a sending unit configured to convert the output signal into a millimeter-wave signal and send the millimeter-wave signal.

(12) The transmission apparatus according to any one of (1) to (10), further including
a sending unit configured to convert the output signal into an optical signal and send the optical signal.

(13) The transmission apparatus according to any one of (1) to (10), further including
a receiving unit configured to receive a millimeter-wave signal and extract a baseband signal from the millimeter-wave signal, in which
the detection unit detects the plurality of signals included in the baseband signal, and
the output control unit controls output of the output signal, the output signal including the plurality of signals included in the baseband signal.

(14) The transmission apparatus according to any one of (1) to (10), further including
a receiving unit configured to receive an optical signal and convert the optical signal into an electric signal, in which
the output control unit controls output of the output signal, the output signal including the plurality of signals included in the electric signal.

(15) The transmission apparatus according to any one of (1) to (14), in which
the plurality of signals include LFPS (Low Frequency Periodic Signaling).

(16) A transmission method, including the steps of:
detecting each of a plurality of signals from an input signal, the plurality of signals having different speeds; and
controlling output of an output signal on a basis of detection results of the plurality of signals, the output signal including the plurality of signals.

(17) A filter circuit, including
at least one of a first circuit and a second circuit, the first circuit including pulse width reducers that are connected in cascade and each shorten a pulse width of a signal, the second circuit including pulse width expanders that are connected in cascade and each expand the pulse width of the signal.

(18) The filter circuit according to (17), in which
the second circuit is provided at a subsequent stage or a previous stage of the first circuit.

REFERENCE SIGNS LIST 1 transmission apparatus
11 detection unit
12 output control unit
21, 22 detector
41 hysteresis comparator
42 high-speed signal filter
43 low-speed control signal detector
61-1 to 61-$n$ pulse width reducer
101 hysteresis comparator
102 detection circuit
103 detector circuit
104 power supply
105 hysteresis comparator
151 control signal generator
152 control logic circuit
153 variable power supply
154 switch
155 selector
201 transmission apparatus
211-1 to 211-$m$ buffer
251 transmission apparatus
261-1 to 261-$p$ buffer
301 detection unit
311 hysteresis comparator
331 high-speed signal filter
341-1 to 341-$n$ pulse width expander
371, 381 high-speed signal filter
501 sending apparatus
511 sending unit
521 laser driver
522 laser diode
551 sending apparatus
561 millimeter-wave sender
601 receiving apparatus
611 receiving unit
621 opto-electronic conversion element
622 current-voltage conversion circuit
651 sending apparatus
661 millimeter-wave receiver

What is claimed is:

1. A transmission apparatus, comprising:
a detection unit configured to detect each of a plurality of signals from an input signal, the plurality of signals having different speeds; and
an output control unit configured to control output of an output signal based on detection results of the plurality of signals, the output signal including the plurality of signals, wherein
during detection of any of the plurality of signals, the output control unit performs control to output a detected signal, and
during no detection of any of the plurality of signals, the output control unit performs control to keep the output signal at a predetermined level.

2. The transmission apparatus according to claim 1, wherein
during detection of a part of the plurality of signals, the output control unit performs control to generate the detected signal and output a generated signal, and
during detection of the rest of the plurality of signals, the output control unit performs control to output the input signal.

3. The transmission apparatus according to claim 1, wherein
during detection of any of the plurality of signals, the output control unit performs control to output the input signal.

4. The transmission apparatus according to claim 1, wherein the plurality of signals includes a first signal and a second signal, the second signal being faster than the first signal, and the detection unit includes:
- a filter circuit configured to remove the second signal from the input signal; and
- a first detection circuit configured to detect the first signal from the input signal from which the second signal is removed.

5. The transmission apparatus according to claim 4, wherein
the input signal is a differential signal,
the detection unit further includes a first hysteresis comparator configured to compare a positive-side signal and a negative-side signal of the input signal, and
the filter circuit removes the second signal from the input signal, the input signal being converted into a digital signal by the first hysteresis comparator.

6. The transmission apparatus according to claim 4, wherein
the filter circuit includes at least one of a first circuit and a second circuit, the first circuit including pulse width reducers that are connected in cascade and each shorten a pulse width of the input signal, the second circuit including pulse width expanders that are connected in cascade and each expand the pulse width of the input signal.

7. The transmission apparatus according to claim 6, wherein
the second circuit of the filter circuit is provided at a subsequent stage or a previous stage of the first circuit.

8. The transmission apparatus according to claim 1, wherein
the plurality of signals includes a first signal and a second signal, the second signal being faster than the first signal, and
the detection unit includes:
- a second detection circuit configured to detect rise of the input signal;
- a detector circuit configured to wave-detect a detection signal, the detection signal being output from the second detection circuit; and
- a second hysteresis comparator configured to compare a detector signal output from the detector circuit and a predetermined reference level, and output a comparison result as a detection result of the second signal.

9. The transmission apparatus according to claim 8, wherein
the input signal is a differential signal,
the detection unit further includes a third hysteresis comparator configured to compare a positive-side signal and a negative-side signal of the input signal, and
the second detection circuit detects the rise of the input signal, the input signal being converted into a digital signal by the third hysteresis comparator.

10. The transmission apparatus according to claim 1, further comprising:
a sending unit configured to convert the output signal into a millimeter-wave signal and send the millimeter-wave signal.

11. The transmission apparatus according to claim 1, further comprising:
a sending unit configured to convert the output signal into an optical signal and send the optical signal.

12. The transmission apparatus according to claim 1, further comprising:
a receiving unit configured to receive a millimeter-wave signal and extract a baseband signal from the millimeter-wave signal, wherein
the detection unit detects the plurality of signals included in the baseband signal, and
the output control unit controls output of the output signal, the output signal including the plurality of signals included in the baseband signal.

13. The transmission apparatus according to claim 1, further comprising:
a receiving unit configured to receive an optical signal and convert the optical signal into an electric signal, wherein
the output control unit controls output of the output signal, the output signal including the plurality of signals included in the electric signal.

14. The transmission apparatus according to claim 1, wherein
the plurality of signals includes LFPS (Low Frequency Periodic Signaling).

15. A transmission method, comprising the steps of:
detecting each of a plurality of signals from an input signal, the plurality of signals having different speeds; and
controlling output of an output signal on a basis of detection results of the plurality of signals, the output signal including the plurality of signals, wherein
during detection of any of the plurality of signals, performing control to output a detected signal, and
during no detection of any of the plurality of signals, performing control to keep the output signal at a predetermined level.

16. A transmission apparatus, comprising:
a detection unit configured to detect each of a plurality of signals from an input signal, the plurality of signals having different speeds, the detection unit includes a filter circuit, comprising:
at least one of a first circuit and a second circuit, the first circuit including pulse width reducers that are connected in cascade and each shorten a pulse width of a signal, and the second circuit including pulse width expanders that are connected in cascade and each expand the pulse width of the signal; and
an output control unit configured to control output of an output signal based on detection results of the plurality of signals, the output signal including the plurality of signals.

17. The filter circuit according to claim 16, wherein the second circuit is provided at a subsequent stage or a previous stage of the first circuit.

* * * * *